(12) United States Patent
Wendte et al.

(10) Patent No.: US 9,894,831 B2
(45) Date of Patent: Feb. 20, 2018

(54) TWIN-ROW PLANTER WITH TANDEM DRIVEN SEED METERS

(71) Applicant: CNH Industrial America LLC, New Holland, PA (US)

(72) Inventors: Keith W. Wendte, Willowbrook, IL (US); Brian t. Adams, Centralia, MO (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/355,990

(22) Filed: Nov. 18, 2016

(65) Prior Publication Data

US 2017/0064903 A1    Mar. 9, 2017

Related U.S. Application Data

(62) Division of application No. 14/589,508, filed on Jan. 15, 2015, now Pat. No. 9,526,201.

(51) Int. Cl.
*A01C 7/20* (2006.01)
*A01C 19/02* (2006.01)
(Continued)

(52) U.S. Cl.
CPC .............. *A01C 19/02* (2013.01); *A01C 7/046* (2013.01); *A01C 7/16* (2013.01)

(58) Field of Classification Search
CPC .... A01C 7/04; A01C 7/18; A01C 7/20; A01C 19/02; A01C 7/046; A01C 7/16; A01C 21/005
(Continued)

(56) References Cited

U.S. PATENT DOCUMENTS 2,012,017 A    8/1935    Oetjen
4,307,674 A   12/1981    Jennings et al.
(Continued)

FOREIGN PATENT DOCUMENTS

WO    WO86/05352    * 3/1985
WO    2012167244    12/2012

OTHER PUBLICATIONS

Producer.com, "Twin row technology works well for grains, vegetables, oilseeds and pulses", web article, Aug. 2012, The Western Producer, Canada.
(Continued)

*Primary Examiner* — John G Weiss
(74) *Attorney, Agent, or Firm* — Rebecca L. Henkel; Richard K. DeMille

(57) ABSTRACT

The present invention is directed to a twin-row planter with tandem driven seed meters at a pair of row units at each row segment of a twin-row planter. A tandem drive system drives the seed meters in a tandem manner, which may include a single transmission assembly simultaneously rotating a pair of seed discs in the pair of seed meters at each row segment. An indexing system allows for quickly changing an amount of relative rotational or angular indexing of seed disks inside of the pair of seed meters at the pair of row units of each row segment to adjust longitudinal spacing between delivery locations of seeds from the seed disks at planted row segments of a planted twin-row. Adjustments can be made at disk hubs, between shaft segments linking the seed disks, or with multiple sets of mounting holds on the seed disks.

2 Claims, 9 Drawing Sheets

(51) Int. Cl.
*A01C 7/04* (2006.01)
*A01C 7/16* (2006.01)

(58) Field of Classification Search
USPC .................................................. 111/183–185
See application file for complete search history.

(56) References Cited

U.S. PATENT DOCUMENTS

| | | | |
|---|---|---|---|
| 4,493,274 | A | 1/1985 | Robinson, Jr. et al. |
| 5,003,894 | A | 4/1991 | Lafferty |
| 5,025,951 | A | 6/1991 | Hook et al. |
| 5,601,209 | A | 2/1997 | Barsi et al. |
| 5,740,747 | A | 4/1998 | Stufflebeam et al. |
| 6,213,035 | B1 | 4/2001 | Harrison |
| 6,516,733 | B1 * | 2/2003 | Sauder ................. A01C 7/044 111/180 |
| 6,520,100 | B1 | 2/2003 | Spooner, Sr. et al. |
| 6,848,377 | B2 | 2/2005 | Rylander et al. |
| 7,377,221 | B1 | 5/2008 | Brockmeier |
| 8,151,718 | B2 | 4/2012 | Mariman et al. |
| 2010/0282142 | A1 | 11/2010 | Preheim |
| 2012/0174841 | A1 | 7/2012 | Friggstad |
| 2015/0351315 | A1 | 12/2015 | Wendte |
| 2016/0165794 | A1 * | 6/2016 | Czapka ............... A01C 21/005 111/185 |

OTHER PUBLICATIONS

Monosem, "Monosem Twin Row Planters", Catalog, 2013, Monosem, US.
Great Plains Product Catalog, Great Plains Mfg., 2010, US.

\* cited by examiner

TWIN-ROW PLANTER WITH TANDEM DRIVEN SEED METERS

CROSS-REFERENCE TO RELATED APPLICATION

The present application is a divisional of application Ser. No. 14/589,508 filed Jan. 15, 2015.

FIELD OF THE INVENTION

The invention relates generally to row-crop planters and, in particular, to a twin-row planter with tandem driven seed meters.

BACKGROUND OF THE INVENTION

Modern farming practices strive to increase yields of agricultural fields. Yields can be increased by increasing plant populations. Efforts have been made to increase plant populations by planting row crops with narrower row spacing, allowing more rows to be planted in a field, which may require harvesting with special equipment configured for harvesting narrow rows, such as narrow row heads for the harvesting implements. Twin-row planters have been developed that plant seeds as a pair of row segments that are closely width-spaced. Each pair of row segments is spaced from adjacent pairs of row segments at conventional row widths, allowing conventional heads to be used on the harvesting implements. This is typically done by mounting a pair of row units with a corresponding pair of seed meters at each row segment, with the seed meters longitudinally staggered in a forward seed meter and rearward seed meter relationship. Seed meters of twin-row planters are typically also made from components are narrower than in non-twin-row planters, with each of the seed meters separately mounted to the toolbars of the twin-row planters. This longitudinal staggering and relatively narrower component configuration of the paired row units provides the mounting space needed for separately mounting the paired row units and their corresponding pair of seed meter drive systems from a toolbar of the twin-row planter.

SUMMARY OF THE INVENTION

The present invention is directed to a twin-row planter with tandem driven seed meters at a pair of row units at each row segment of a twin-row planter. A tandem drive system may drive the seed meters in a tandem manner with a single transmission assembly simultaneously rotating a pair of seed discs in the pair of seed meters at each respective row unit. This allows the tandem drive system to occupy relatively little space on the twin-row planter, providing enough space so that the pair of row units at each row segment may have full-sized seed meters arranged side-by-side adjacent in transverse alignment with each other, without additional weight from a separate drive system for each seed meter. An indexing system is provided that allows for quickly changing an amount of relative rotational or angular indexing of seed disks inside of the pair of seed meters at the pair of row units of each row segment to control longitudinal spacing between delivery locations of seeds from the seed disks. This allows for driving rotation of the seed disks at an identical rate of rotation while providing adjustability of delivery characteristics to accommodate planting different seed types in different planting sessions with seed disks having different seed pocket spacing(s) on the seed disks, to provide consistent plant spacing after emergence.

According to another aspect of the invention, the pair of row units at each row segment of the twin-row planter may be supported from a single head bracket supported by a toolbar of the twin-row planter, with the pair of row units spaced close enough to each other to deliver seeds in first and second planted row segments that can be harvested with a single row segment of a standard-width harvester, for example, with the first and second planted row segments being transversely spaced from each other by between about 5 inches and 10 inches, such as between about 7 inches and 8 inches.

According to another aspect of the invention, a twin-row planter is provided with a chassis towable behind a tractor through an agricultural field for planting seeds onto the field during a planting session. Multiple row segments are supported by the chassis. Each of the multiple row segments includes a first seed meter supported at the row segment for singulating seeds for individual delivery onto the field. The seeds are delivered out of the first seed meter in a first planted row segment, with the seeds longitudinally aligned and spaced apart from each other. A second seed meter is supported at the row segment for singulating seeds for individual delivery onto the field in a second planted row segment. The seeds are delivered out of the second seed meter in a second planted row segment, with the seeds from the second seed meter longitudinally aligned and spaced apart from each other and longitudinally staggered with respect to the first planted row segment. A tandem drive system with a transmission assembly delivers power to both the first and second seed meters for singulating and delivering seeds on the first and second planted row segments, respectively.

According to another aspect of the invention, transmission assembly may include a shaft assembly with a first shaft segment and second shaft segment engaging and rotating in unison with the first shaft segment. The first shaft segment may deliver power to the first seed meter and the second shaft segment may deliver power to the second seed meter. The first seed meter may further include a first seed disk rotated by the first shaft segment of the shaft assembly inside the first meter to convey individual seeds through the first seed meter for individual delivery onto the field in the first planted row segment. The second seed meter may further include a second seed disk rotated by the second shaft segment of the shaft assembly inside the second meter to convey individual seeds through the second seed meter for individual delivery onto the field in the second planted row segment.

According to another aspect of the invention, an indexing system is arranged with respect to the shaft assembly to selectively adjust an angular index position of the seed disks of the first and second seed meters with respect to each other. The indexing system may include an indexing disk hub system having a disk hub configured for adjusting an angular index position of the disk hub with respect to the shaft assembly to correspondingly adjust the angular index position of the seed disks of the first and second seed meters with respect to each other. The indexing disk hub system may include a shaft hub mounted to and rotating in unison with the shaft assembly and a disk hub adjustably mounted to the shaft assembly for rotation in unison with the shaft hub. The disk hub may be movable from a first angular position with respect to the shaft hub to a second angular position with respect to the shaft hub. This allows for adjusting relative positions of seed pockets in the first and second seed disks with respect to each other while rotating in unison with each other during the planting session to change spacing characteristics of the seeds in the first planted row segment relative to the seeds in the second planted row segment. The disk hub may engage a first end surface of the shaft hub, and the indexing system may further include a clamping ring engaging a second end surface of the shaft hub. The clamping ring and disk hub may be configured to loosen and tighten for selectively unclamping and clamping the shaft hub therebetween. This respectively unlocks the indexing disk hub system permitting adjustment of the angular index position of the disk hub with respect to the shaft assembly and locks the indexing disk hub system for locking the disk hub and the shaft assembly into rotational unison with each other. The shaft hub may include slots extending through the thickness of the shaft hub. The slots may define perimeters extending longitudinally across portions of the first and second end surfaces of the shaft hub. Fasteners may extend through the slots of the shaft hub, interconnecting the disk carrier and the clamping ring. The fasteners may be movable the length of the slots to slide along the slot for adjusting of the angular index position of the disk hub with respect to the shaft assembly.

According to another aspect of the invention, the indexing system may include an indexing shaft hub system having a first shaft hub connected to the first shaft segment of the shaft assembly and a second shaft hub connected to the second shaft segment of the shaft assembly. The indexing shaft hub system may be configured for adjusting an angular index position of the first and second shaft hubs with respect to each other to correspondingly adjust the angular index position of the seed disks of the first and second seed meters with respect to each other. The indexing shaft hub system may further include a coupler assembly selectively locking the first and second shaft hubs into rotational unison with each other for correspondingly locking the first and second shaft segments of the shaft assembly into rotational unison with each other. The coupler assembly of the indexing shaft hub system may include a pin and multiple bores in the first and second shaft hubs. Each of the multiple bores may be configured to receive the pin for establishing a respective predetermined angular index position of the first and second shaft hubs with respect to each other and a corresponding predetermined angular index position of the seed disks of the first and second seed meters with respect to each other. One of the first and second shaft hubs may be axially movable with respect to the other one of the first and second shaft hubs for adjusting an angular index position of the first and second shaft hubs with respect to each other by withdrawing the pin from a first one of the multiple bores and inserting the pin into a second one of the multiple bores.

According to another aspect of the invention, the indexing system may include a multiple-index position seed disk system including a shaft hub mounted to and rotating in unison with the shaft assembly. The shaft hub may include a hub body with lugs extending from the hub body. At least one of the first and second seed disks may include a first set of mounting holes and a second set of mounting holes configured to receive the lugs of the shaft hub to arrange at least one of the first and second seed disks in a first angular index position and a second angular index position, respectively. Each of the first and second seed disks may have a first set of mounting holes with each of the mounting holes of the first set of mounting holes having a first perimeter shape and a second set of mounting holes with each of the mounting holes of the second set of mounting holes having a second perimeter shape. The multiple-index position seed disk system may include a first shaft hub mounted to the first shaft segment of the shaft assembly with the first shaft hub including a hub body with lugs extending from the hub body and having a first perimeter shape configured to receive the mounting holes of the first set of mounting holes to mount a first seed disk at a first angular index position relative to the shaft assembly. A second shaft hub is mounted to the second shaft segment of the shaft assembly. The second shaft hub has a hub body with lugs extending from it, with the lugs having a second perimeter shape configured to receive the mounting holes of the second set of mounting holes to mount a second seed disk at a second angular index position relative to the shaft assembly. In this way, the different shapes of the different sets of mounting holes ensure the disc(s) is mounted in the correct angular index position for the particular seed meter(s).

According to another aspect of the invention, at each row segment, the seed meters may be mirror images of each other. Each of the first and second seed meters may include a seed chamber and an air pressure chamber. The seed and air pressure chambers of the first and second seed meters are mirrored with respect to each other about a line of reflection extending in a longitudinal direction between the first and second seed meters.

According to another aspect of the invention, the tandem drive system includes a transmission assembly delivering power to a single location at a shaft assembly. The shaft assembly may extend transversely between the first and second seed disks along a common axis of rotation of the first and second seed disks and may deliver power from the transmission assembly to simultaneously rotate the first and second seed disks. This may allow the seed meters to be parallel to each other in transversely aligned, side-by-side, relationship within each of the row segments of the twin-row planter.

According to another aspect of the invention, the indexing system is configured to selectively disengage the first and second shaft segments of the shaft assembly to permit relative rotation of the first and second shaft segments of the shaft assembly during an indexing adjustment procedure. The selective disengagement by way of the indexing system also facilitates removal of either one of the meters without having to remove the other. The indexing system is further configured to selectively engage and lock the first and second shaft segments of the shaft assembly into rotational unison with each other with the first and second seed disks angularly indexed with respect to each other at times other than during the indexing adjustment procedure.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
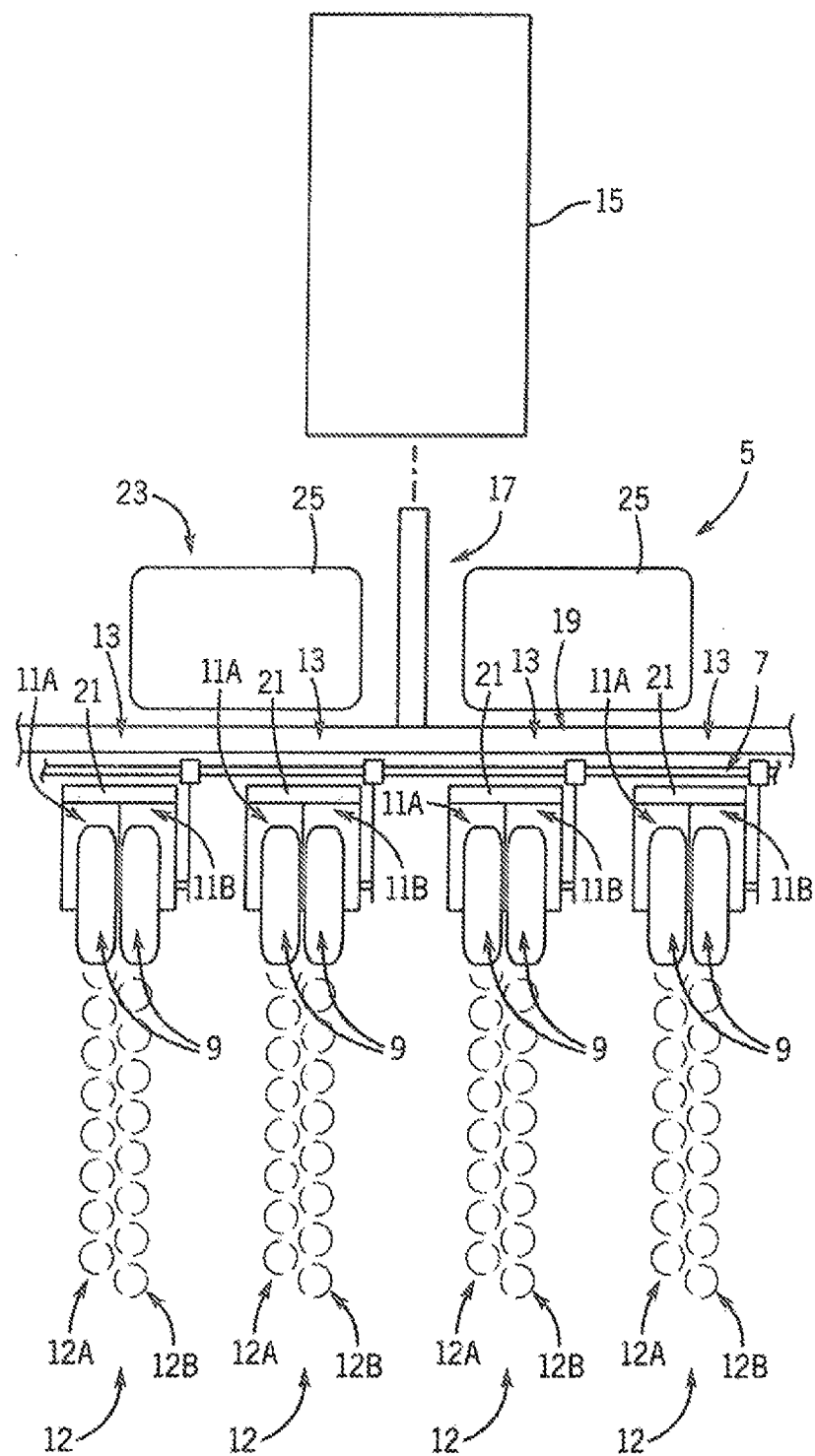
FIG. 1 illustrates a simplified schematic view of a twin-row planter with tandem driven seed meter in accordance with the present invention.
Figure 2:
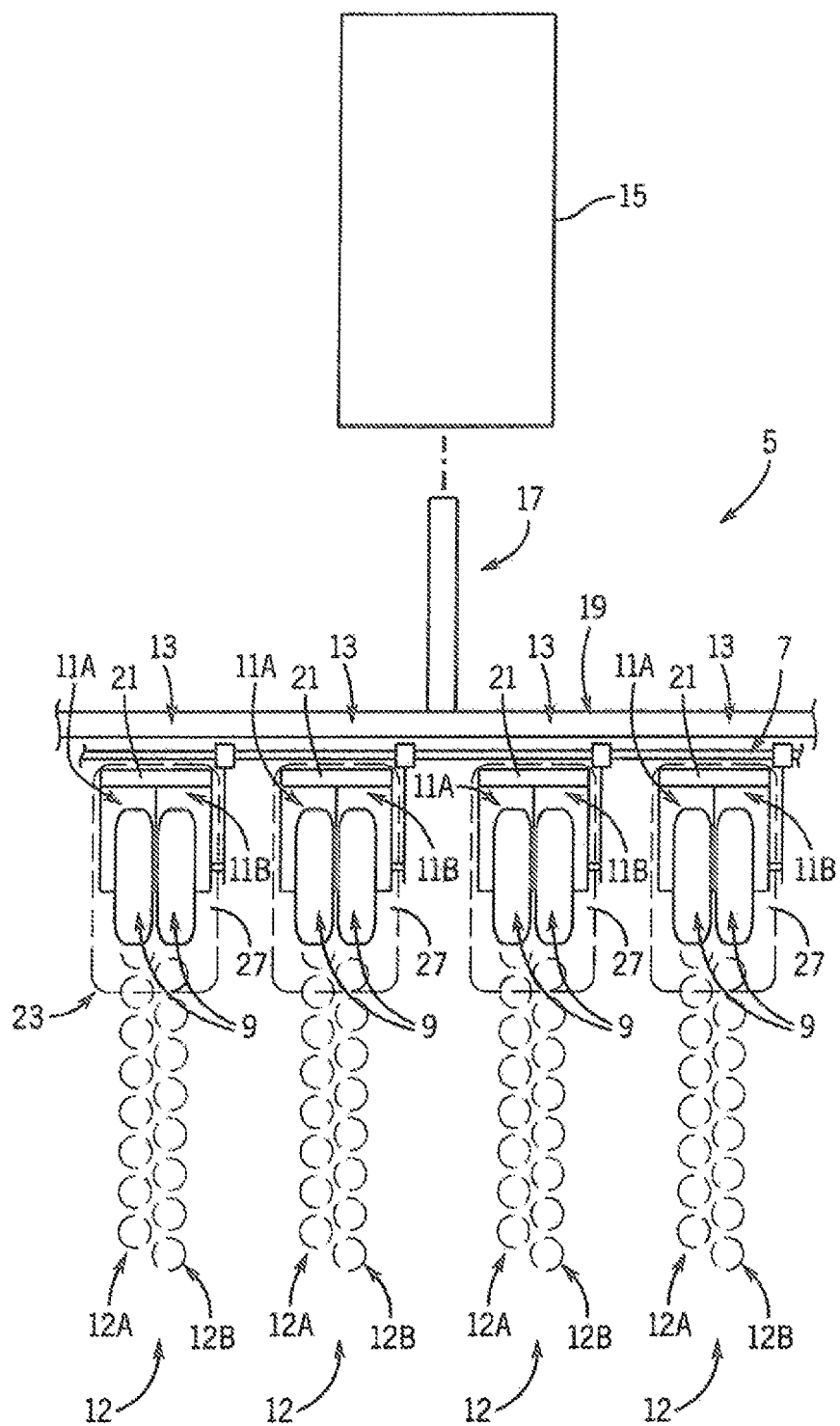
FIG. 2 illustrates a variant of the planter of FIG. 1.

Referring now to the drawings and specifically to the simplified schematic representations of FIGS. 1 and 2, a twin-row planter 5 is shown with a tandem drive system 7 for driving both seed meters 9 in a pair of row units 11A, 11B at each row segment 13 of the planter 5 while facilitating angular indexing coordination of components of the seed meter to optimize twin-row seed placement consistency within staggered planted row planted row segments 12A, 12B of singulated seeds in a twin-row 12 delivered by the row units 11A, 11B at each row segment 13, as explained in greater detail elsewhere herein. The planter 5 may be or may include components of planters available from Case IH, such as the EARLY RISER® series planters and/or the twin-row planters such as models Twin-Row 4025A39S, 1225AFF, 1625AFF, and 825A3PM, also available from Case IH. The planter 5 is towed behind a tractor 15 and has a chassis 17 with a frame including a toolbar 19 that supports the multiple row segments 13, which are substantially identical. Each row segment 13 has a twin-row configuration with its respective pair of row units 11A, 11B connected to a single head bracket 21 that is attached to the toolbar 19 through a parallel linkage system (not shown) mounting each row segment 11 to the planter chassis 17. At each row segment 13, pair of row units 11A, 11B and the respective seed meters 9 are parallel to each other in a transversely aligned, side-by-side relationship with each row unit 11A, 11B and its seed meter 9 longitudinally spaced from the toolbar 19 by the same distance. Each row unit 11A, 11B has ground-engaging tools (not shown) that may include opening and closing mechanisms such as opener disks and closing disks, respectively, or other ground-engaging tools for opening and closing a furrow. The ground-engaging tools may also include a gauge wheel configured for adjusting furrow depth by limiting soil penetration of the furrow-opening mechanism of the ground-engaging tools while creating a furrow and a press wheel may be arranged to roll over the closed furrow to firm the soil over the seed to further close the furrow and promote favorable seed-to-soil contact.

Still referring to FIGS. 1 and 2, seed is stored in bulk on the planter 5 in a bulk seed storage system 23 that delivers the storage seed to the row units 11A, 11B at each row segment 13. Referring now to FIG. 1, the seed storage system is shown as a central bulk storage system, with bulk fill tanks 25, that holds the seeds in bulk that will be pneumatically delivered from the bulk fill tanks 25 to the row units 11A, 11B at each row segment 13. Referring now to FIG. 2, the seed storage system is shown as an on-row bulk storage system, with on-row bulk fill hoppers 27, that holds the seeds in bulk that will be gravity fed to the row units 11A, 11B at each row segment 13. Regardless of where the seeds are stored on the planter 5 and how the seeds are delivered to the row units 11A, 11B at each row segment 13, the seed meter 9 at each row unit 11A, 11B is configured to singulate and deliver individual seeds to the agricultural field to provide the planted row planted row segments 12A, 12B of singulated seeds in each twin-row 12. The seeds delivered from the first row unit 11A are deposited onto the field so that they are longitudinally aligned and spaced apart from each other within the planted row segment 12A, with seed placements represented by the dashed-line circles in the planted row segment 12A. The seeds delivered from the first row unit 11B are deposited onto the field so that they are longitudinally aligned and spaced apart from each other within the planted row segment 12B, with seed placements represented by the dashed-line circles in the planted row segment 12B. The seeds of the first and second planted row segments 12A, 12B are transversely spaced close enough to each other to be harvested with a single row segment of a standard-width harvester. The first and second planted row segments 12A, 12B may be transversely spaced from each other by between about 5 inches and 10 inches, such as between about 7 inches and 8 inches. The seeds of the first planted row segment 12A are longitudinally staggered with respect to the seeds of the second planted row segment 12B. Adjacent twin-rows 12 of adjacent row segments 13, which may be defined by longitudinally extending center-lines that extend between the first and second planted row segments 12A, 12B, are spaced from each other by distances allowing the twin-rows 12 to be harvested with a single row segment of a standard-width harvester, such as about 30 inches, 24 inches, or other standard row spacing.

Figure 3:
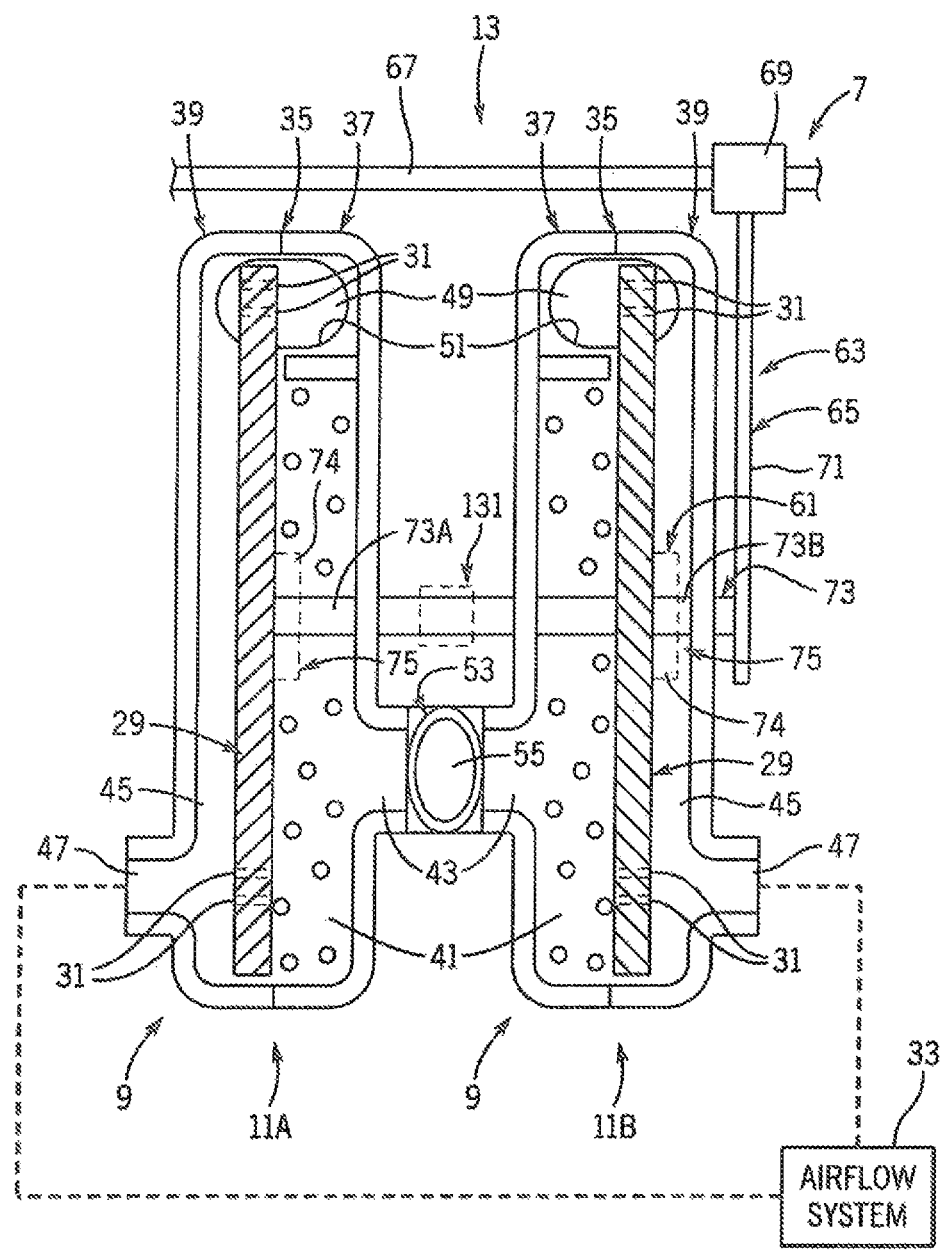
FIG. 3 illustrates a simplified schematic view of a row unit meter of the planter of FIG. 1.
Figure 4:
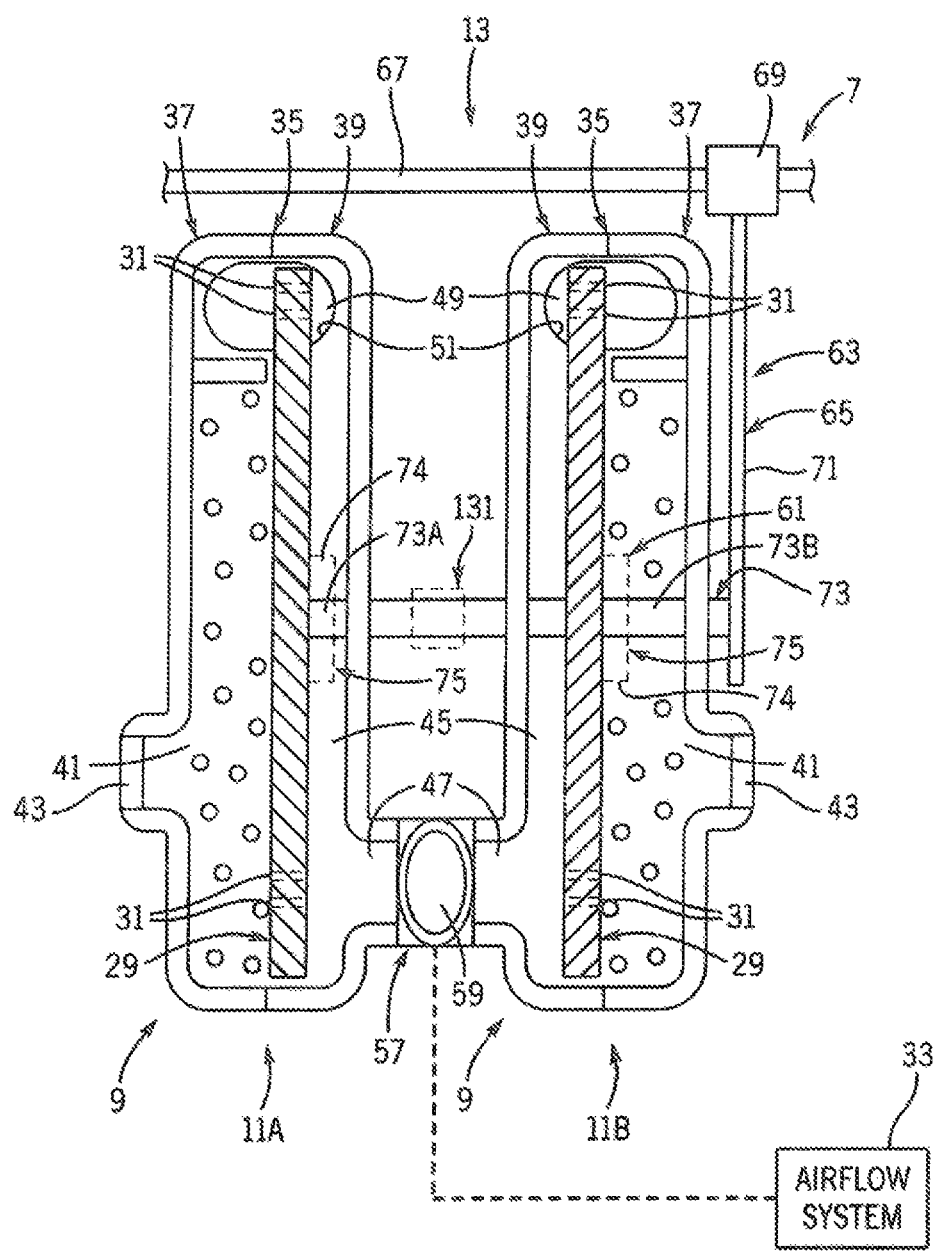
FIG. 4 illustrates a simplified schematic view of a variant of the row unit meter of FIG. 3.
Figure 5:
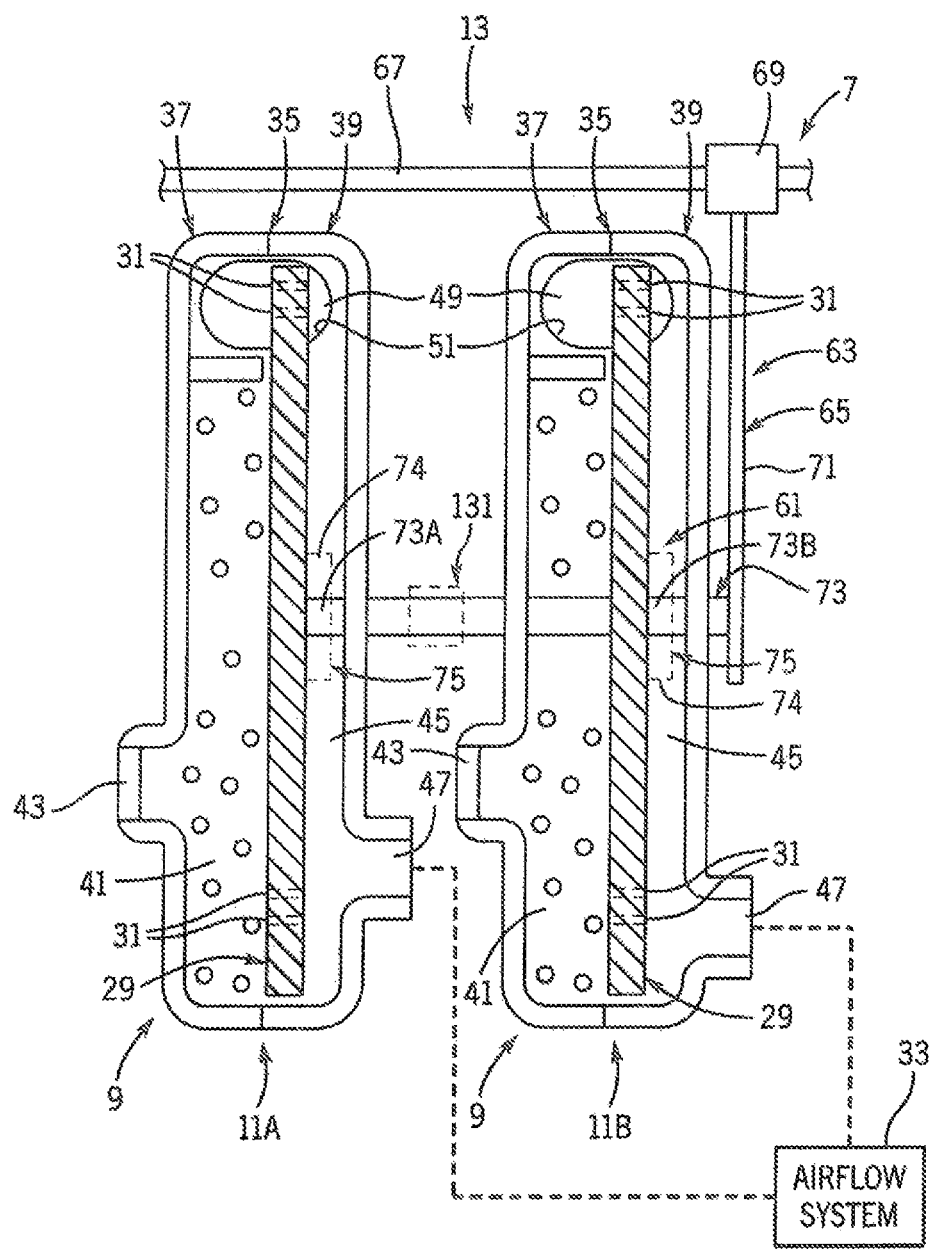
FIG. 5 illustrates a simplified schematic view of another variant of the row unit meter of FIG. 3.

Referring now to FIGS. 3-5, each seed meter 9 includes an internal seed disk 29 with seed pockets 31 for picking up and carrying the individual seeds through the seed meter 9. The tandem drive system 7 simultaneously rotates both seed disks 29 of the seed meter 9 at each row segment 13 through a seed pool inside of the seed meter 9 to expose the seed pockets 31 to the seeds in the seed pool to pick up the seeds in the seed pockets 31. Although shown as extending axially through or between opposing surfaces of the seed disk 29, the seed pockets 31 may extend at least partially into an outer circumferential surface of the seed disk 29. The seed meters 9 can be purely mechanical-type seed meters 9 or can be pneumatic seed meters 9, as shown. Pneumatic seed meters 9 are operatively connected to an airflow system 33. The airflow system 33 may include a positive air pressure source and/or a vacuum source for establishing positive and/or vacuum pressures and corresponding air flows for operation of seed meters 9 at the row units 11A, 11B, such as within air pressure chambers of the seed meters 9. The positive air pressure source and vacuum sources can be known pumps, fans, blowers, and/or other known airflow system components. When the seed storage system 23 is configured with a central bulk storage system (FIG. 1), the airflow system 33 includes a seed conveyance airflow system providing an airflow that entrains the seeds to move the seeds from bulk storage in the bulk fill tanks 25 through seed conduits to the row units 11A, 11B, such as to mini-hoppers (not shown) that feed the seed meters 9. When the seed meters 9 are positive pressure pneumatic seed meters 9, the airflow system 33 is configured to provide a positive airflow and a corresponding positive pressure within the seed meters 9 to push seeds into and hold the seeds in the seed pockets 31 of the seed disks 29 by positive pressure through introducing pressurized air into the seed meters 9. When the seed meters 9 are vacuum pressure pneumatic seed meters 9, the airflow system 33 is configured to provide a vacuum airflow and a corresponding negative pressure within the seed meters 9 to pull and hold the seeds in the seed pockets 31 of the seed disks 29 by vacuum pressure introduced into the seed meters 9 by evacuating air out of the seed meters.

Referring now to FIGS. 3-5, each seed meter 9 has a housing 35 that includes interconnected covers, shown as a seed-side cover 37 and a vacuum-side cover 39 that collectively enclose the interior of the seed meter 9 and cover the seed disk 29. The seed-side cover 37 is arranged parallel to and spaced from the seed disk 29. A seed reservoir 41 in which the seed pool collects is defined in the space between the seed-side cover 37 and the seed disk 29. A seed inlet 43 extends through the seed-side cover 37 to define a passageway as an entry point allowing seeds to enter the seed reservoir 41 from the bulk seed storage system 23 (FIGS. 1 and 2). The vacuum-side cover 39 is arranged parallel to and spaced from the seed disk 29, on the other side of the seed disk than the seed-side cover 37. An air pressure chamber shown as vacuum chamber 45 in which the vacuum pressure is created in the housing 35 is defined in the space between the vacuum-side cover 39 and the seed disk 29. A vacuum inlet 47 extends through the vacuum-side cover 39 to define a passageway through which air can flow out of the housing 35 to establish vacuum pressure inside the seed meter 9. A seed tube 49 extends from an outlet 51 of the housing 35. The seed tube 49 receives seeds that are released from the seed disk 29 through the outlet 51 and directs the seed to the soil.

Referring now to FIGS. 3 and 4, the seed meters 9 are shown as mirror images of each other. The components and segments of the seed meters 9 of the row units 11A, 11B including the seed disks 29, the seed reservoirs 41, and the vacuum chambers 45 are mirrored with respect to each other about a line of reflection extending in a longitudinal direction between the seed meters 9 of the of the row units 11A, 11B. Referring now to FIG. 3, the seed reservoirs 41 of the seed meters 9 of the row units 11A, 11B are arranged facing each other. A shared seed inlet duct 53 defines a T-shaped or split outlet body with a single duct inlet 55 that is operably connected to components of the bulk seed storage system 23 to direct seeds through the seed inlet duct 53 to the seed reservoirs 41 of both seed meters 9 of the row units 11A, 11B at each row segment 13. Referring now to FIG. 4, the vacuum chambers 45 of the seed meters 9 of the row units 11A, 11B are arranged facing each other. A shared vacuum inlet duct 57 defines a T-shaped or split outlet body with a single duct inlet 59 that is operably connected to the airflow system 33 to draw air out of and create a vacuum pressure within the vacuum chambers 45 of both seed meters 9 of the row units 11A. 11B at each row segment 13.

Figure 6:
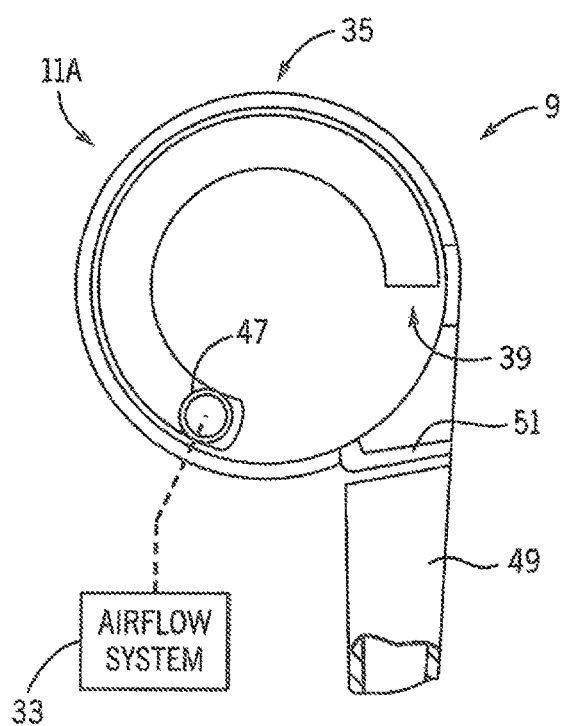
FIG. 6 illustrates a side elevation view of a seed meter of the row unit of FIG. 5.
Figure 7:
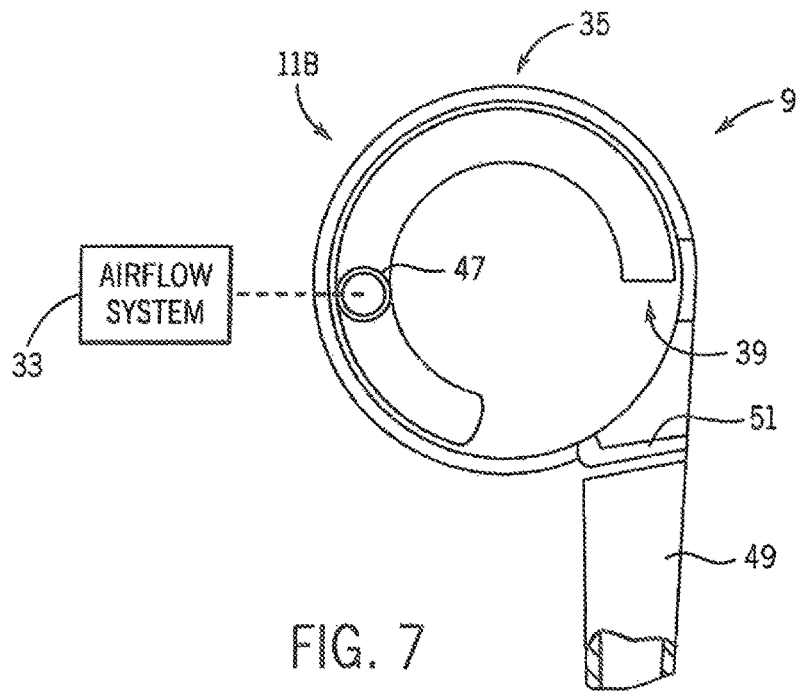
FIG. 7 illustrates a side elevation view of a seed meter of the row unit of FIG. 5.

Referring now to FIG. 5, instead of being mirror images of each other, the seed meters 9 are shown arranged with the same general side-to-side layouts. Referring now to FIGS. 5-7, the vacuum inlet 47 is arranged at different locations on the vacuum-side cover 39 on the two seed meters 9 of the row units 11A, 11B. The vacuum inlet 47 of the seed meter 9 of row unit 11A is arranged relatively lower on the seed meter 9, closer to the seed tube 49 (FIG. 6). The vacuum inlet 47 of the seed meter 9 of row unit 11B is arranged relatively higher on the seed meter 9, further from the seed tube 49 (FIG. 7). The clocked or misaligned relationship of the row unit 11A seed meter 9 vacuum inlet 47 and the row unit 11B seed meter 9 vacuum inlet 47 provides sufficient clearance for a vacuum line or hose (not shown) to extend between the seed meters 9 of the row units 11A, 11B.

Referring again to FIGS. 3-5, the seed disks 29 of each seed meter 9 are driven into rotation by the tandem drive system 7 that includes an indexing system 61 that is configured to facilitate angular indexing coordination of the seed disks 29 to provide a desired predetermined seed delivery pattern of the planted row planted row segments 12A, 12B at each twin-row 12. After the seed disks 29 are indexed with respect to each other during an indexing adjustment procedure, explained in greater detail elsewhere herein, the tandem drive system 7 provides consistent delivery characteristics of the seeds from the seed meters 9 of the row units 11A, 11B by simultaneously delivering power to and rotating the seed disks 29 in unison with each other through a common power flow path.

Still referring to FIGS. 3-5, the tandem drive system 7 includes a transmission assembly 63 selectively delivering power to the seed meters 9 of the row units 11A, 11B as controlled by a tractor control system and/or planter control system, which can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the seed meters 9 and tandem drive system 7 and other components of the planter 5. The transmission assembly 63 is shown with mechanical chain drives 65 that deliver rotating driving power from a rotating shaft 67. The shaft 67 is driven to rotate from the ground through movement of the planter 5, such as by a traction-drive-type drive wheel, ground-engaging drive sprocket, or may be rotated by a motor such as an electric motor, pneumatic motor, or hydraulic motor. Clutches 69 are controlled by the control system to engage and disengage for selectively transmitting rotation of the shaft 67 into movement of chains 71 which rotate sprockets that are attached to and rotate a shaft assembly 73 that drives rotation of a pair of disk hubs 74 mounted to the shaft assembly 73 and that support the seed disks 29 such that rotation of the shaft assembly 73 rotates both seed disks 29. Clutches 69 may be, for example, air clutches or electro-mechanical clutches, configured to selectively transmit rotation of or prevent transmission of rotation of the shaft(s) 67 to the shaft assembly 73, coupling or uncoupling power between the shaft(s) 67 and the shaft assembly 73 and thus to the seed disks 29.

Still referring to FIGS. 3-5, the shaft assembly 73 includes a first shaft segment 73A rotating the seed disk 29 in the seed meter 9 of the first row unit 11A and a second shaft segment 73B rotating the seed disk 29 in the seed meter 9 of the second row unit 11B. During a planting session, the first and second shaft segments 73A, 73B are locked into rotation unison with each other. When the first and second shaft segments rotate in unison with each other, the seeds released from the first and second row units 11A, 11B are delivered with seed spacing that is intra-row consistent within each of the planted row segment 12A, 12B and inter-row consistent between the seeds in the first planted row segment 12A and the second planted row segment 12B. The intra-row seed and plant spacing is established primarily by the spacing between seed pockets 31 of the seed disks 29. The inter-row seed and plant spacing is established primarily and can be adjusted by the indexing system 61. The indexing system 61 allows for adjusting the longitudinal spacing of the seed positions of the planted row segments 12A, 12B to achieve predetermined spacing characteristics by facilitating arranging the seed disks 29 in predetermined angular index positions with respect to each other. The predetermined angular index positions may be discrete positions of components of the indexing system 61 that provide corresponding amounts of angular indexing of the seed disks 29 based on the type of seed being singulated by the seed disks 29 and, for example, spacing of the seed pockets 31 in the seed disks 29 and thus seed placement in the planted row segments 12A, 12B of each twin-row 12.

Figure 8:
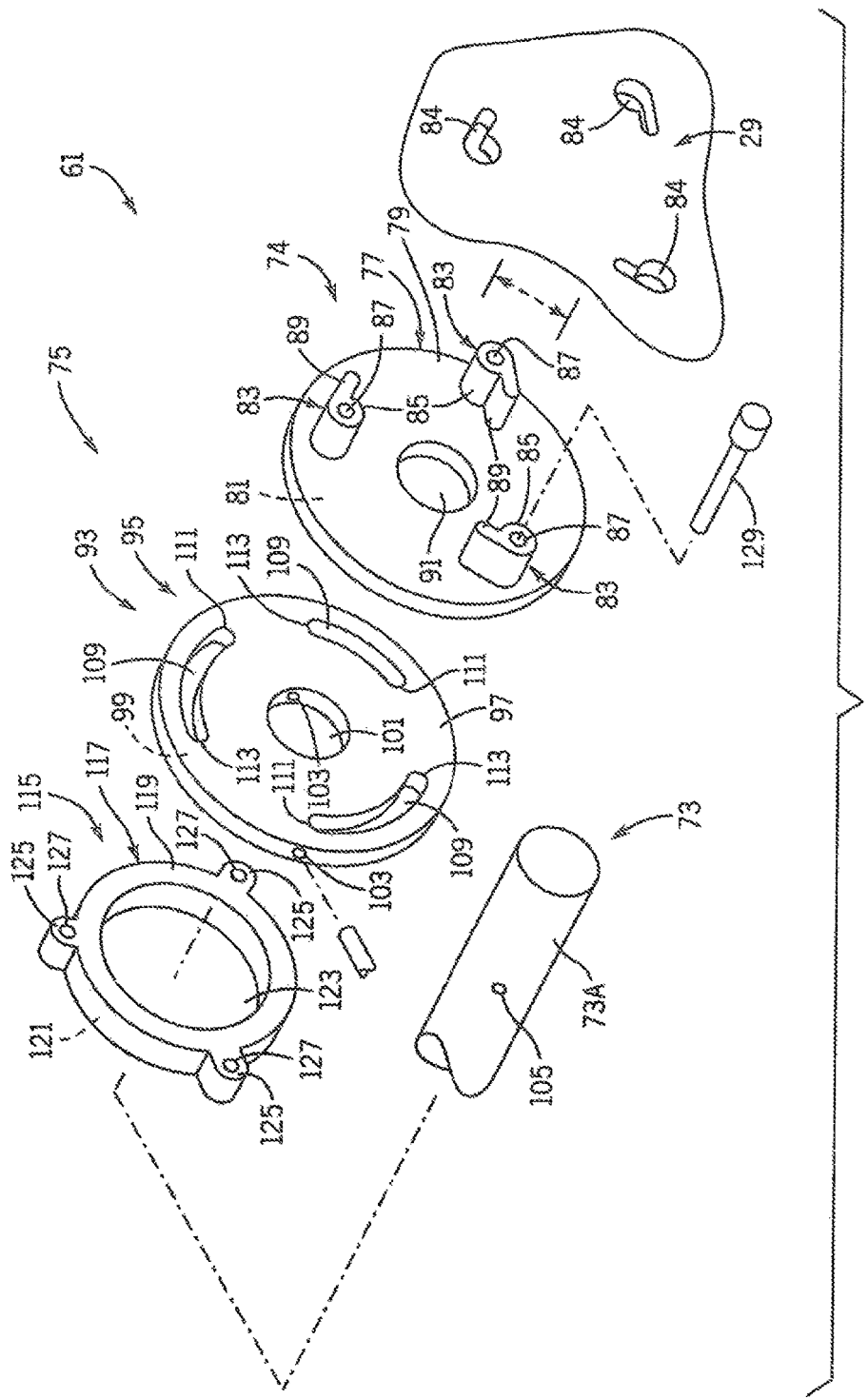
FIG. 8 illustrates an exploded isometric view of an indexing system of the present invention.

Referring now to FIG. 8, the indexing system 61 is shown with an indexing disk hub system 75 that is configured to support the disk hub 74 for adjustable movement relative to the shaft assembly 73 during the indexing adjustment procedure and then re-locks the disk hub 74 into rotational unison with the shaft assembly 73. The disk hub 74 has a hub body 77 that may be plate-like with a circular outer perimeter shape with opposite first and second end surfaces 79, 81 facing respectively toward and away from the seed disk 29, a central portion of which is shown in FIG. 3. The disk hub 74 has lugs 83 extending from the end surface 79 that faces the seed disk 29. Lugs 83 are configured to support the seed disk 29 by fitting into mounting holes 84 of the seed disk 29. Each lug 83 is a perimeter shape extending collectively around first and second segments of the lug 83. The first segment of the lug 83 defines a main segment 85 of the lug 83 through which a bore 87 extends and that is, from an end view, generally circular. A second segment of the lug 83 defines a finger segment 89 that is, from an end view, generally elongate and extends tangentially away from the main segment 85 of the lug 83. A central bore 91 extends entirely through the hub body 77 at its central axis and is configured to concentrically accommodate shaft assembly 73, such as the first and/or second shaft segment 73A, 73B therein. As shown, the shaft assembly 73 is concentrically housed within the central bore 91 of the disk hub 74 and can rotate relative to the shaft assembly 73. Relative rotation of the disk hub 74 upon the shaft assembly 73 is restricted by the interaction of disk hub 74 and a shaft hub 93 that is fixed with respect to the shaft assembly 73. The shaft hub 93 has a hub body 95 that may be plate-like with a circular outer perimeter shape with opposite first and second end surfaces 97, 99 facing respectively toward and away from the seed disk 29. The shaft hub 93 has a central bore 101 that extends entirely through the hub body 95 at its central axis and is configured to concentrically accommodate shaft assembly 73. Shaft hub fixing bores 103 extend radially through the hub body 95 and are aligned with each other on opposite sides of the hub body 95 and a shaft bore 105 extending radially through the shaft assembly 73. A pin 107 extends through the shaft hub fixing and shaft bores 103, 105 to fix the hub body 95 and the shaft assembly 73 to each other, locking the hub body 95 and shaft assembly 73 into rotational unison with each other. Slots 109 extend through the entire thickness of the hub body 95 of the shaft of 93. Each slot 109 has first and second ends 111, 113 and defines an opening that is elongate and curved, generally parallel to the outer perimeter of the hub body 95 between the first and second ends 111, 113.

Still referring to FIG. 8, the indexing disk hub system 75 includes a clamping ring 115 with a body 117 that may be ring-shaped or generally annular with opposite first and second end surfaces 119, 121 facing respectively toward and away from the seed disk 29. The clamping ring 115 has a central opening 123 through which the shaft assembly 73 extends and lobes 125 extending radially outward from an outer circumferential surface of the body 117, spaced from each other about a perimeter of the clamping ring 115. Each lobe 125 has a bore 127 that aligns with the bores 87 of the disk hub lobes 83. Fasteners 129 (only one shown) extend through the bores 87 of the disk of the lobes 83, through the shaft hub slots 109 and into and are secured within the clamping ring lobe bores 127. This provides a stacked arrangement of the indexing disk hub system 75 with the shaft hub 93 sandwiched between the disk hub 74 and the clamping ring 115, with respective end surfaces of the disk hub 74, shaft hub 93, and clamping ring 115 engaging each other. Tightening and loosening the fasteners 129 allows the components of the indexing disk hub system 75 to be locked as a unit against each other or to permit relative movement of the disk hub 74 and clamping ring 115 relative to the shaft hub 93 for adjusting indexing positions of the seed disk 29 during an indexing adjustment procedure. Indexing adjustment movement of the disk hub 74 and clamping ring 115 relative to the shaft hub 93 is limited to the amount of travel permitted by the fasteners 129 along the length of the shaft hub slots 109, with first and second stop positions defined when the fasteners 129 engage the first and second ends 111, 113 of the slots 109.

Figure 9:
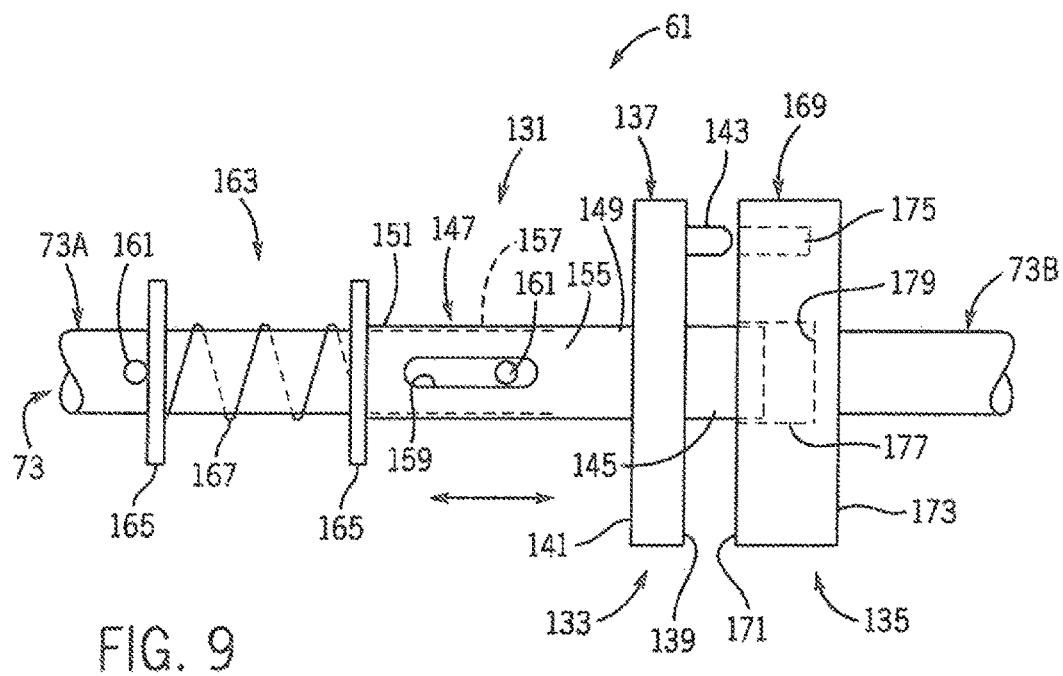
FIG. 9 illustrates a side elevation view of another indexing system of the present invention.

Referring now to FIG. 9, the indexing system 61 is shown with an indexing shaft hub system 131 that is configured to allow for indexing adjustment procedures by adjusting relative angular index positions of the first and second shaft segments 73A, 73B with respect to each other. The indexing shaft hub system 131 is a first shaft hub 133 arranged for rotational unison with the first shaft segment 73A and a second shaft hub 135 arranged for rotation unison with the second shaft segment 73B. The first and second shaft hubs 133, 135 are configured to selectively engage with each other to translate rotation between the first and second shaft segments 73A, 73B. Adjusting the relative rotational or angular index positions of the first and second shaft hubs 133, 135 when engaged for locking the first and second shaft segments 73A, 73B into rotational unison correspondingly changes the relative angular index positions of the first and second shaft segments 73A, 73B and the corresponding seed disks 29 with respect to each other. The first shaft hub 133 has a hub body 137 that may be plate-like with a circular outer perimeter shape with opposite first and second end surfaces 139, 141 facing respectively toward and away from the second shaft hub 135. A pin 143 extends from an intermediate portion of the first surface 139 of the hub body 137 toward the second shaft hub 135 for locking the first and second shaft hubs 133, 135 to each other. A stub shaft 145 extends from a central portion of the first surface 139 of the hub body 137 toward the second shaft hub 135 for maintaining alignment of the first and second shaft hubs 133, 135 and the first and second shaft segments 73A, 73B with respect to each other. A collar 147 extends from the second surface 141 of the hub body 137 to facilitate axial movement of the first shaft 133 with respect to the shaft assembly 73. Collar 147 has a first end 149 attached to a central portion of the first shaft hub 133 and a second end 151 spaced from the first shaft hub 133. The collar 147 has a circumferential side wall 155 extending around a bore 157 that concentrically receives the first shaft segment 73A. A slot 159 extends through the circumferential side wall 155 of the collar 147. Pins 161 extend from an outer surface of the first shaft segment 73A, with one pin 161 arranged within the slot 159 to define a restricted travel path of the collar 147 and the first shaft 133 is guided by the slot 159 sliding over the pin 161.

Still referring to FIG. 9, a biasing arrangement 163 pushes the first shaft hub 133 toward the second shaft hub 135 in a default or resting state that is overcome temporarily during the indexing adjustment procedure. The biasing arrangement 163 includes a pair of flanges 165 with a biasing member shown as a spring 167 mounted concentrically outside of the first shaft segment 73A between the flanges 165, pushing the flanges 165 away from each other. The pin 161 shown toward the left-hand side retains the flange 165 shown toward the left-hand side in place on the first shaft segment 73A. The flange 165 shown toward the right-hand side is attached to the second end 151 of the collar 147. The flanges 165 hold the spring 167 in compression, which urges the collar 147 and first shaft hub 133 toward the second shaft hub 135. The second shaft hub 135 has a hub body 169 that may be plate-like with a circular outer perimeter shape with opposite first and second end surfaces 171, 173 facing respectively toward and away from the first shaft hub 133.

Figure 10:
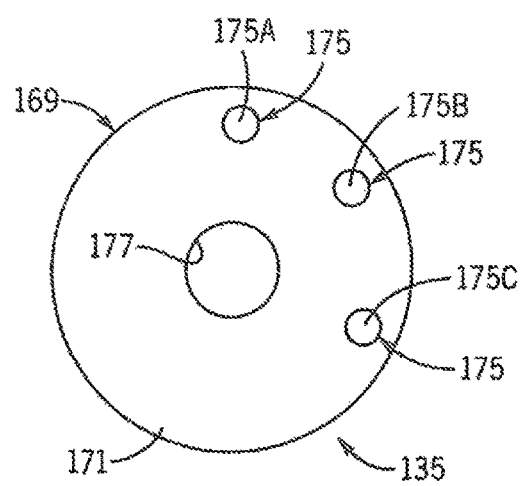
FIG. 10 illustrates an end view of a shaft hub of the indexing system of FIG. 9.

Referring now to FIGS. 9 and 10, bores 175 extend into an intermediate portion of the first end surface 171 of the hub body 169 with openings facing toward the first shaft hub 133 for receiving the pin 143 of the first shaft hub 133 for locking the first and second shaft hubs 133, 135 to each other. Referring now to FIG. 10, the bores 175 are spaced from each other about the first end surface 171 of the hub body 169, shown as represented in different positions 175A, 175B, and 175C. Aligning and inserting the pin 143 into the bores 175 at the different positions 175A, 175B, 175C provides different predetermined angular indexing positions of the first and second shaft segments 73A, 73B with respect to each other because the first shaft hub 133 is rotationally fixed with respect to the first shaft segment 73A, and the second shaft hub 135 is rotationally fixed with respect to the second shaft segment 73B. A central bore 177 extends into a central portion of the first end surface 171 of the hub body 169, with an opening facing toward the first shaft hub 133. The central bore 177 is configured to receive the stub shaft 145 for maintaining alignment of the first and second shaft hubs 133, 135 and the first and second shaft segments 73A, 73B with respect to each other, even when the stub shaft 145 advances toward and regresses away from a bottom wall 179 of the central bore 177 when the first shaft hub 133 is released toward or pulled away from the second shaft hub 135 during the indexing adjustment procedure.

Figure 11:
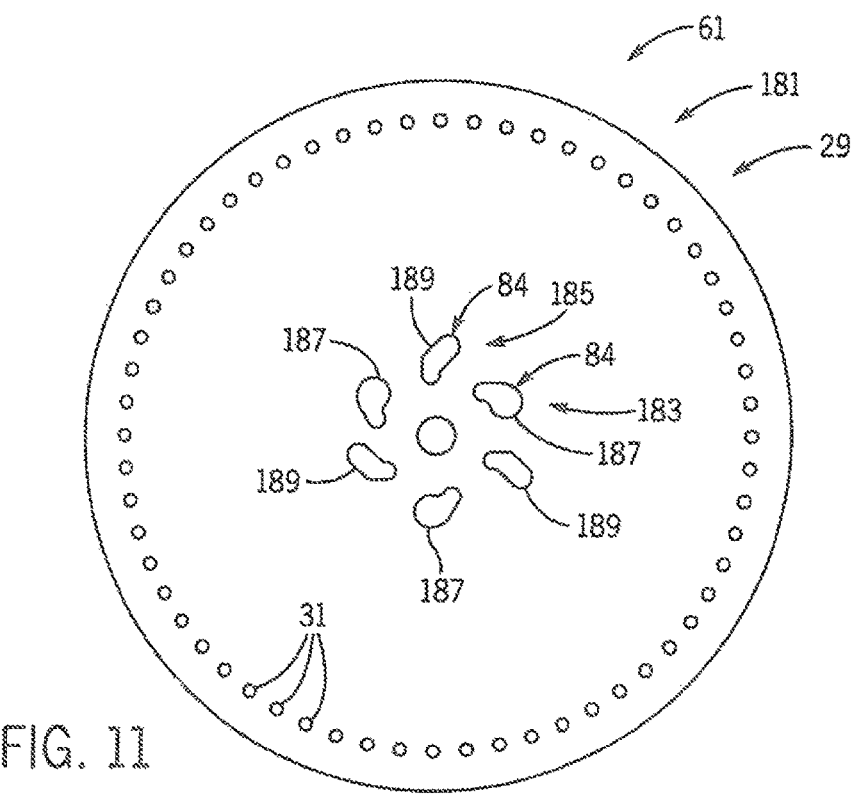
FIG. 11 illustrated a side elevation of a seed disk of another indexing system of the present invention.
Figure 12:
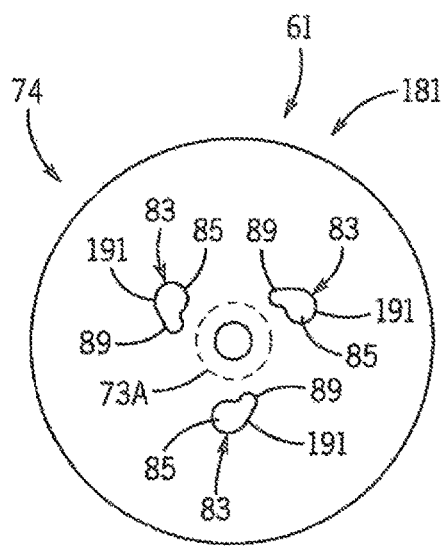
FIG. 12 illustrated a side elevation of a disk hub of another indexing system of the present invention.
Figure 13:
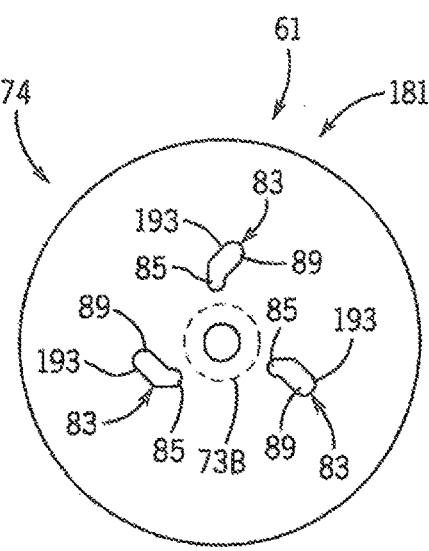
FIG. 13 illustrated a side elevation of a disk hub of another indexing system of the present invention.

Referring now to FIGS. 11-13, the indexing system 61 is shown with a multiple-index position seed disk system 181 that is configured to allow for indexing adjustment procedures by adjusting requiring the seed disks 29 (FIG. 11) to mount to the disk hub 74 (FIG. 12) on the first shaft segment 73A in only a first angular index position and to the disk hub 74 (FIG. 13) on the second shaft segment 73B in only a second angular index position, providing a predetermined relative amount of angular index between the seed disks 29 in the seed meters 9 of the first and second row units 11A, 11B (FIGS. 3-5). Referring now to FIG. 11, the seed disk 29 has first and second sets 183, 185 of mounting holes 84. The mounting holes 84 of the first set 183 have a first perimeter shape 187 and the mounting holes 84 of the second set 185 have a second perimeter shape 189.

Referring now to FIG. 12, the lugs 83 of the disk hub 74 arranged on the first shaft segment 73A have a first perimeter shape 191 that corresponds to the first perimeter shape 187 of the first set 183 of mounting holes 84 (FIG. 11) of the seed disk 29. This permits mounting the seed disk 29 onto the disk hub 74 in the seed meter 9 of the first row unit 11A in only a first mounting position, with the first set 183 of the mounting holes 84 fit over the lugs 83 with the first perimeter shape 191 (FIG. 12), providing a predetermined angular index position of the seed disk 29 for the first row unit 11A (FIGS. 3-5).

Referring now to FIG. 13, the lugs 83 of the disk hub 74 arranged on the second shaft segment 73B have a second perimeter shape 193 that corresponds to the second perimeter shape 189 of the second set 185 of mounting holes 84 (FIG. 11) of the seed disk 29. This permits mounting of the seed disk 29 onto the disk hub 74 in the seed meter 9 of the second row unit 11B in only a second mounting position, with the second set 185 of the mounting holes 84 fit over the lugs 83 with the second perimeter shape 193 (FIG. 13), providing a predetermined angular index position of the seed disk 29 for the second row unit 11B (FIGS. 3-5).

Regardless, the indexing system 61 allows for quickly and accurately changing inter-row spacing characteristics of the seeds in the first planted row segment 12A and the second planted row segment 12B (FIGS. 1 and 2). Indexing system 61 does this by facilitating adjustment of relative amounts of rotational or angular indexing of the seed disks 29 based at least in part on the seed type being planted and the configuration of the seed disks 29 for planting a particular type of seed. A desired spacing characteristic of seed placement for the seeds in the first and second planted row segments 12A, 12B may be a function of a disk angle of index between the seed disks 29 of the seed meters 9 of the first and second row units 11A, 11B and a function of the spacing of adjacent seed pockets 31 of the particular seed disk(s) 29. A desired disk angle of index of the seed disks 29 of the seed meters 9 of the first and second row units 11A, 11B can be 60 degrees plus one-half of a seed angle of index of each seed disk 29, provided by an angle defined between imaginary straight lines extending from adjacent seed pockets 31 through and converging at an axis of rotation of the seed disk 29. For example, if imaginary straight lines extending from adjacent seed pockets 31 through and converging at the axis of rotation of the seed disk 29 defines a seed angle of index of 6-degrees, then the disk angle of index of the pair of seed disks 29 at each row segment 13 should be 63 degrees.

Many changes and modifications could be made to the invention without departing from the spirit thereof. The scope of these changes will become apparent from the appended claims.

We claim:
1. A twin-row planter with tandem driven seed meters, the twin-row planter comprising:
   a chassis towable behind a tractor through an agricultural field for planting seeds onto the field during a planting session; and
   multiple row segments supported by the chassis, each of the multiple row segments including,
      a first seed meter supported at the row segment for singulating seeds for individual delivery onto the field in a first planted row segment with the delivered seeds of the first planted row segment longitudinally aligned and spaced apart from each other,
      a second seed meter supported at the row segment for singulating seeds for individual delivery onto the field in a second planted row segment with the delivered seeds of the second planted row segment longitudinally aligned and spaced apart from each other and longitudinally staggered with respect to the first planted row segment; and a tandem drive system with a transmission assembly delivering power to both the first and second seed meters for singulating and delivering seeds on the first and second planted row segments, respectively, the transmission assembly including a shaft assembly with a first shaft segment and second shaft segment engaging and rotating in unison with the first shaft segment and wherein the first shaft segment delivers power to the first seed meter and the second shaft segment delivers power to the second seed meter;

wherein:

the first seed meter includes a first seed disk rotated by the first shaft segment of the shaft assembly inside the first meter to convey individual seeds through the first seed meter for individual delivery onto the field in the first planted row segment;

the second seed meter includes a second seed disk rotated by the second shaft segment of the shaft assembly inside the second meter to convey individual seeds through the second seed meter for individual delivery onto the field in the second planted row segment;

an indexing system is arranged with respect to the shaft assembly to selectively adjust an angular index position of the seed disks of the first and second seed meters with respect to each other, the indexing system including an indexing disk hub system having a disk hub configured for adjusting an angular index position of the disk hub with respect to the shaft assembly to correspondingly adjust the angular index position of the seed disks of the first and second seed meters with respect to each other;

the indexing disk hub system includes a shaft hub mounted to and rotating in unison with the shaft assembly, and a disk hub adjustably mounted to the shaft assembly for rotation in unison with the shaft hub;

the disk hub is movable from a first angular position with respect to the shaft hub to a second angular position with respect to the shaft hub for adjusting relative positions of seed pockets in the first and second seed disks with respect to each other while rotating in unison with each other during the planting session to change spacing characteristics of the seeds in the first planted row segment relative to the seeds in the second planted row segment;

the disk hub engages a first end surface of the shaft hub and the indexing system includes a clamping ring engaging a second end surface of the shaft hub; and the clamping ring and disk hub are configured to loosen and tighten for selectively unclamping and clamping the shaft hub therebetween to respectively unlock the indexing disk hub system permitting adjustment of the angular index position of the disk hub with respect to the shaft assembly and lock the indexing disk hub system for locking the disk hub and the shaft assembly into rotational unison with each other.

2. The twin-row planter of claim 1, wherein the shaft hub includes slots extending through the thickness of the shaft hub and defining perimeters extending longitudinally across portions of the first and second end surfaces of the shaft hub and wherein fasteners extend through the slots of the shaft hub interconnecting the disk carrier and the clamping ring with the fasteners movable along the lengths of the slots for adjusting of the angular index position of the disk hub with respect to the shaft assembly.

* * * * *